United States Patent [19]
Lhospice

[11] Patent Number: 4,632,526
[45] Date of Patent: Dec. 30, 1986

[54] SUPPORT STRUCTURE FOR A SPECTACLES FRAME AND FRONT INTENDED TO BE ADAPTED THERETO

[75] Inventor: Bernard Lhospice, Blois, France

[73] Assignee: Essilor International (Campagnie Generale d'Optique), Creteil, France

[21] Appl. No.: 666,891

[22] Filed: Oct. 31, 1984

[30] Foreign Application Priority Data

Dec. 19, 1983 [FR] France ................ 83 20275

[51] Int. Cl.⁴ ............................................. G02C 5/02
[52] U.S. Cl. ..................................... 351/124; 351/57; 351/155
[58] Field of Search .................. 351/124, 125, 80, 88, 351/92, 134, 135, 140, 147, 150, 149, 41, 121, 133, 142, 130, 155, 158, 57

[56] References Cited

U.S. PATENT DOCUMENTS 4,322,138  3/1980  Minart ............................ 351/133

Primary Examiner—Rodney B. Bovernick
Assistant Examiner—P. M. Dzierzynski
Attorney, Agent, or Firm—Burgess, Ryan & Wayne

[57] ABSTRACT

The present invention relates to a support structure for a spectacles frame and a front intended to be adapted thereto. The support structure comprises a locking arm or shutter movable in rotation between an open position where it allows to penetrate the projecting element of the front in an interacting hollow housing and a locking position where it is folded back in order to block this projecting element. Application to the realization of spectacles frames having detachable fronts.

8 Claims, 7 Drawing Figures

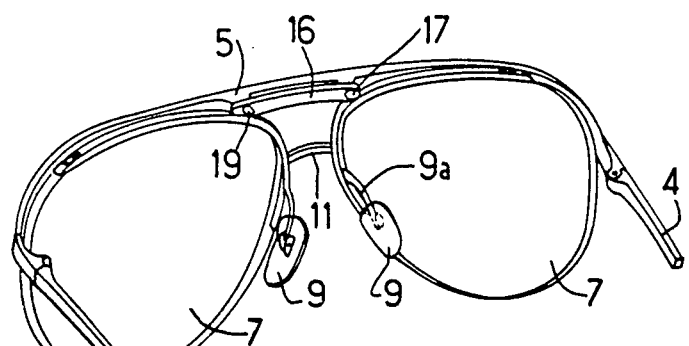
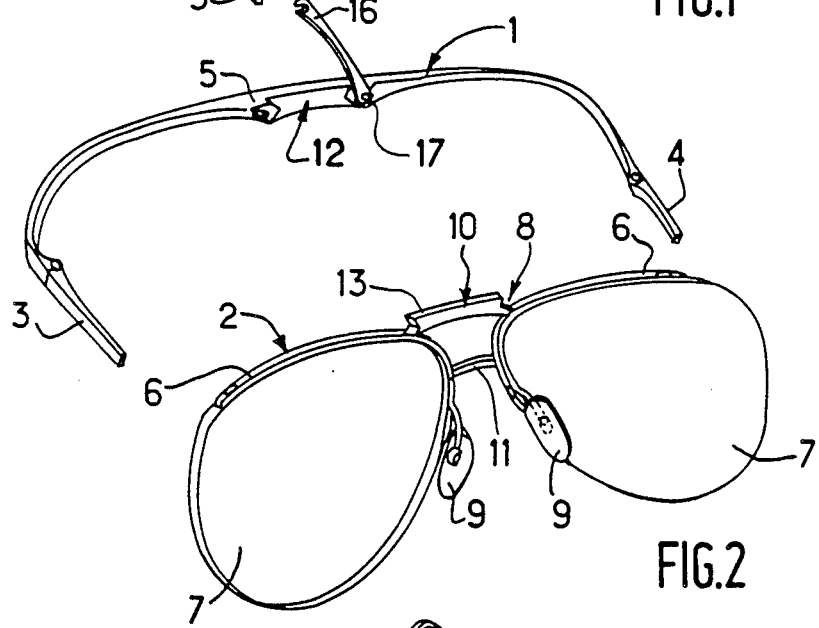
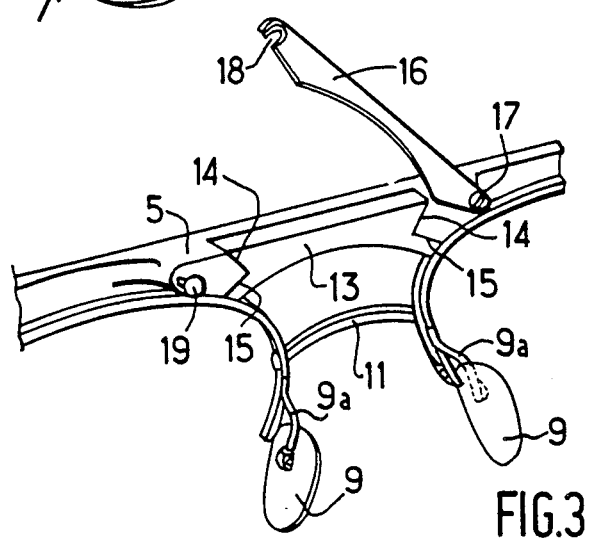

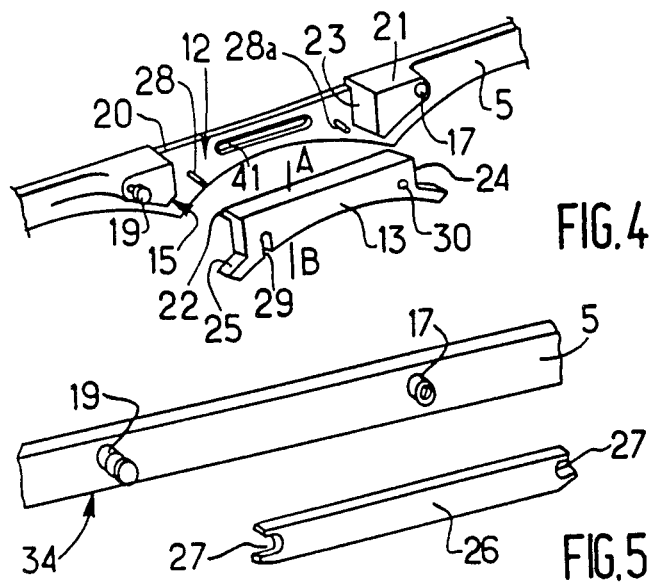
FIG.4
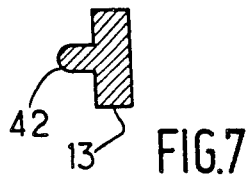
FIG.5
FIG.7
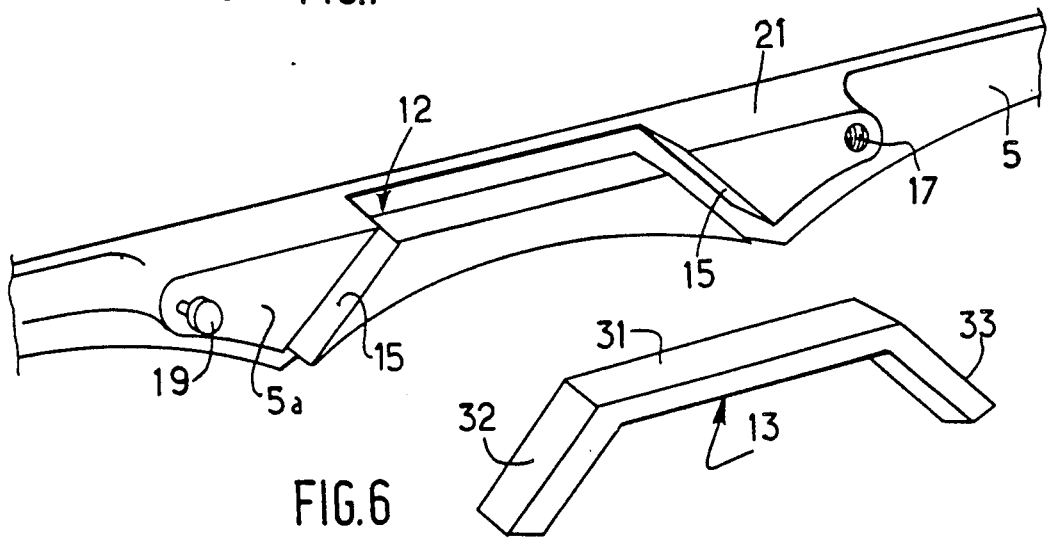
FIG.6

SUPPORT STRUCTURE FOR A SPECTACLES FRAME AND FRONT INTENDED TO BE ADAPTED THERETO

BACKGROUND OF THE INVENTION

The present invention concerns a spectacles frame formed by the combination of two separable and detachable parts, respectively a support structure connected to spectacle sides or temples and a detachable front, one of the parts comprising at least first assembly means, while the other comprises second interacting assembly means cooperating with the first when the structure and the front are placed in assembly position. It also applies to each of the separated elements, front or support structure, individually realized and intended to be subsequently assembled with the other.

More generally, frames of this type have the advantages of simplifying the positioning of the opthalmic glasses or lenses which must equip them and/or of facilitating the change of glasses according to the wearer's requirements in function of their conditions of use (near or far vision, ambient lighting, etc, for example). Furthermore, these frames allow to arrange each of these different fronts to be used in less space than that required for a complete spectacles frame.

DESCRIPTION OF THE PRIOR ART

In French patent applications filed under No. 80 03 466, No. 81 15512, No. 82 06575 and 83 05 761 by the applicant, is described a spectacles frame having a detachable front that satisfies comfort and aesthetic requirements which were not met in the realizations of the prior art such as those described in French patent published under No. 2,094,810 or U.S. Pat. No. 3,713,732.

The spectacles frames that were described in the above-mentioned patent applications comprise a detachable front provided with a median bridge, generally formed of two parallel cross-bars, and a support structure fitted with one or several support points. After securing of a front on the support structure, elastic locking means ensure the securing in place of the front against any external accidental stresses.

These composite spectacles frames satisfy fixed objectives: however, their locking in place by elastic interlocking of the front on the hooking points of the support structure allow risks of accidental separation of the structure from the front to persist through accidental disconnection and requires from the operator who assembles the two separated elements of the frame a skill and a manual force that he does not always have.

SUMMARY OF THE INVENTION

The present invention allows to realize a spectacles frame having a detachable front as well as a support structure and associated fronts which do not present these drawbacks and which ensure an assembly without clearance of the support structure and the front while offering a agreeable aesthetic aspect allowing the stylist to realize more varied and distinct forms of spectacles.

The aims of the present invention are achieved due to the fact that in the support structure of the present invention, on the one hand, the assembly means are constituted by at least one hollow housing provided on the internal central portion of the support structure and, on the other hand, the said support structure comprises at least one locking arm or shutter movable in rotation between an open position where a projecting cooperating element of the front is intended to be introduced into the hollow housing(s) and locking position where the arm or the shutter is folded back and closes at least partially the hollow housing(s) and blocks the said cooperating element of the face.

In order to increase further the locking quality, the rotary locking arm bears on its movable end first locking means adapted to cooperate in locking position of the said arm with second locking means, integral with the support structure in order to strengthen this locking position and authorize the displacement of the locking arm towards its open position solely after engagement of a locking action.

According to another embodiment of the invention, the hollow housing presents on each side at least one inclined front acting as blocking front of the lateral displacement of the cooperating element of the front. The internal surfaces of the hollow housing can comprise at least one nipple adapted to be housed in a reception space presenting a bearing surface for the nipple and provided in the cooperating element of the front. In a variant, the hollow housing is delimited by two nipples adapted to cooperate with a cross-bar integral with the front, and presenting at its end two housings open on the outside and in each of which a nipple can be engaged in order to immobilize laterally the front.

According to another embodiment of the invention, the reception housing of the projecting element has a ⌒ shape or the shape of an arc or a roof in order to constitute inclined fronts provided on each side of the housing.

According to one embodiment allowing an improved adjustment of the assembled elements, an easier engagement of these prior to their assembly and an aesthetic or identification effect on the support structure, the housing for the projecting element presents a ribbed recess provided at the bottom of the hollow housing and issuing on the external fore front of the spectacles frame.

The central part in which is provided the hollow housing is constituted by a separated element assembled on a principal bar of the support structure by any suitable assembly means such as a screw or welding.

In a variant, the assembly means of the separated element are constituted by threaded end-pieces, respectively, of an articulation axis of the locking shutter and a nipple adapted to cooperate with blocking means of the said shutter in locking position, the said threaded end-pieces being screwed down in corresponding threads of the principal bar.

The front for a spectacles frame according to the invention intended to be assembled to a support structure such as described herein-above is noteworthy in that it comprises at least one projecting element adapted to be introduced into the hollow housing(s) provided on the internal central portion of the support structure with the aim of securing the front on the support structure. The projecting element of the front can comprise on each side at least one inclined front acting as blocking front of its lateral displacement in the housing of the support structure. In a variant, the front comprises at least one reception space provided with a bearing surface for a nipple integral with the internal surface of the housing of the support structure.

According to another embodiment of the invention, it comprises a cross-bar adapted to be engaged in a hollow housing of the support structure delimited by two nipples, the said cross-bar presenting at its end two housings open on the outside in each of which one of the nipples can be engaged in order to immobilize laterally the front.

According to another realization variant of the front, the projecting element is constituted at least partially by a solid or hollow bar folded in the form of ⌒ or a roof or an arc in order to constitute the inclined fronts provided on each side of the projecting element.

According to another embodiment, further improving the quality of fitting together the complementary elements of the front and of the support structure, the projecting element comprises a frontal rib adapted to be engaged in a interacting ribbed housing provided at the bottom of the hollow housing of the support structure.

BRIEF DESCRIPTION OF THE DRAWINGS

Other aims, features and advantages of the invention will become apparent from reading through the following description of various embodiments of the invention, given by way of non-limitative example with reference to the annexed drawings in which:

FIG. 1 represents in perspective a spectacles frame according to the invention comprising support structure and a front in assembled position;

FIG. 2 is an exploded view of FIG. 1 prior to assembly of the support structure and the front;

FIG. 3 shows on a larger scale the central portion of the support structure and the front with the locking shutter in open position;

FIGS. 4 and 5 are exploded views in perspective with torn away sections and on a larger scale of the central portion of the support structure of the front, illustrating various assembly means;

FIG. 6 is an exploded view in perspective on a larger scale with torn away sections of an embodiment with an assembly element in folded outline;

FIG. 7 is a cut along the line AB of FIG. 4 illustrating the projecting element provided with the central rib.

BRIEF SUMMARY OF THE DRAWINGS

FIGS. 1 to 3, and more particularly FIG. 2, show that the spectacles frame according to the invention comprises a support 1 and a front 2. The support structure classically comprises two sides 3 and 4 articulated about a median portion 5. Front 2 comprises two eye-wires or surrounds 6, that are both adapted to receive a glass 7, the eye-wires 6 being connected by a bridge 8 constituted, for example, by two horizontal bars: an upper locking bar 10 and a lower bar 11. Nasal rest pads 9 are each borne by an arm 9a fixed on each eye-wire 6.

According to the invention, the median portion 5 of the support structure 1 comprises first assembly mean constituted by a hollow housing 12 adapted to receive second assembly means presenting the form of a projecting element 13 provided on the upper hooking bar 10. The external surface of the projecting element 13 is exactly complementary to or interacting with the internal surface of the housing 12 in such a way that it is possible to introduce frontally the element 13 in the housing 12 that presents on each side two lateral chamfered edges 14 and 15 (cf. FIG. 3). Element 13 is thus maintained with a minimum of clearance inside the housing 12.

According to one characteristic of the invention, a locking shutter or arm 16 is articulated about an axis 17 on the central portion 5 of the support structure 1. When it is placed in open position, as represented in FIG. 3, the arm 16 allows to penetrate the projecting element 13 in the housing 12. The arm 16 can there-after be folded back behind the element 13 as represented in FIG. 1 in order to close the housing 12 towards the rear and prohibit the withdrawal of the projecting element 13, the locking in position of which is thus strengthened by the folding back of the locking arm 16. In order to prevent any untimely recall of the arm 16 in to the high unlocking position, the assembly of the front and the support structure, at the free end of the arm 16 is provided with a locking opening 18 that is engaged elastically in locking position (such as represented in FIG. 1) on a locking nipple 19 borne by the support structure 1.

The positioning and the locking of the front 2 on the support structure 1 is carried out according to a sequence that is easy to imagine. The operator introduces frontally the projecting element 13 in the housing 12 and after being ensured of its correct positioning, he folds back the locking arm 16 behind the projecting element 13 and locks it on the nipple 19. The front of the arm 16 that bears on the rear plane face of the element 13 maintains this element firmly in place. This maintenance can, furthermore, be strengthened by slight bending of the arm 16 which applies it elastically on the plane front or element 13 prior to allowing the introduction of the nipple 19 in locking opening 18. The front 2 and the support structure 1 thus constitute a solid assembly of particularly fine line and a dismountable assembly with very good assembly strength. A series of realization variants of the central assembly portion of the front 2 and the support structure 1 is illustrated in FIGS. 4 to 7 which will be explained herein-after and in which the parts identical to those of FIGS. 1 to 3 bear the same references as those on these figures.

In FIG. 4 the hollow housing 12 is closed by thin blade 20 that ensures the connection between the two sides of the support structure without extending up to the upper front 21 of this support structure in order to allow a thin edge 22 of the projecting element 13 of the front 2 to be introduced at the level of this upper front 21. The housing 12 presents on each side, on the one hand, a lateral front 23 substantially perpendicular to the upper front 21 of the median portion 5 of the support structure 1 and, on the other hand, a front 15 inclined towards the bottom of the housing 12. The intermediary corresponding element 13 presents interacting and complementary fronts to those of the housing 12 such as vertical fronts 24, fronts 25 inclined towards the top and the edge 22 of lateral blocking.

In FIG. 5, on the median portion 5 of the support structure 1, are fixed the axis of articulation 17 of the locking lever 16 and the locking nipple 19 of this locking lever. According to this embodiment of FIG. 5, the axis 17 and the nipple 19 present a supplementary length which allows the introduction between them of a small bar or a cross-bar 26 integral with the front 2 and which comprises at each end a housing or a recess 27 open towards the outside and which can be engaged frontally on contact with the external cylindrical surface of the axis 17 and the nipple 19 in order to therefore constitute a transversal blockin between the housing delimited laterally by the axis 17 and the nipple 19 and the projecting element constituted by the cross-bar 26. The locking arm 16 (not represented) is thereafter folded back behind the cross-bar 16 and locked on the nipple 19 in order to maintain the front confined through the intermediary of the cross-bar 26 on the axis 17 and the nipple 19.

According to a variant represented on FIG. 4, a nipple is shown on the left side of the housing 12, perpendicular to the bottom front of this housing 12. When this projecting element 13 is placed frontally in the housing 12, the nipple 28 is housed in a hollow 29 having a cylindrical bottom provided at the bottom of this element 13, in such a way that the upper portion of the external cylindrical surface of the nipple 28 is borne on the cylindrical bottom of the recess 29. On the right of the housing 12, another nipple 28a shown on the bottom of the housing is housed in assembly position of the element 13 in the housing 12 in a bore 30 of this projecting element 13. In this solution with bore 30, the nipple 28 ensures an improved positioning of the element 13 in the housing 12 but requires an improved relative precision of the internal surface of the housing 12 and the external surface of the element 13.

In the embodiment represented in FIG. 6, the support structure has a central projecting portion 5a which is relatively thick and in which is provided a housing 12, in the form of ⌒, i.e. constituted by an inverse U-shaped outline having a flat bottom and slightly divergent arms. The projecting element 13 which is complementary to the housing 12 can be realized very simply by folding a solid or hollow outline in the form of a bar and folded to the exact shape of the housing 12 with an upper bar 31 connected to two inclined bars 32 and 33. When the projecting element 13 is engaged in the housing 12 in the form of ⌒ or of a roof or an arc, the upper bar 31 matches the upper front 21 of the central or median portion 5 of the support structure and a very good aesthetic appeal of the assembled frame is thus obtained in a version of large eye-wire spectacles and thick frames realized, for example, in plastic material.

The median portion 5 which is projecting from the internal side of the support structure 1 can be constituted by a separated element 5a assembled on a principal bar of this support structure. According to a first embodiment, the median portion 5a is pressed on the fixed bar by any suitable means such as screws placed on the other front or indeed assembly screws constituted by threaded end-pieces of the axis 17 and of the nipple 19 screwed in the corresponding pitches provided in the principal bar 34 of the support structure (cf. FIG. 5) and clamping the separated element 5a on the rear front of the principal bar 34.

According to another embodiment (not represented) the separated element 5a is fixed by welding on each side of the extensions of the support structure 1 towards the spectacles sides 3 and 4 (cf. FIGS. 1 and 2). In order to ensure this attachment, it is possible to foresee plane end surfaces on each of the extensions, these end surfaces entering into contact with a corresponding plane face provided on each side of the separated element 5a realized in weldable material.

According to one detail of the realization represented in FIG. 4, the housing 12 of the projecting element 13 comprises a rib housing 41 that can issue on the frontal fore front of the support structure 1 and thus on the fore front of the spectacles frame. At the assembly of the projecting element 13 in the housing 12, a projecting rib 42, (represented along a section in FIG. 7) provided on the fore front of element 13, is housed in the rib housing 41 and allows the operator to observe de visu on the fore front of the spectacles frame that the element 12 is indeed completely engaged in the housing 12. The rib 42 that presents, preferably, a rounded outline such as represented in FIG. 7 can realize an aesthetic effect on the external fore front of the frame. This aesthetic effect can be strengthened by using for the projecting element 13 or simply for the rib 42 a different colour from that of the support structure 1. The housing 41 being crossing, the rib 42 appears, in fact, outside the assembled spectacles frame in the form of a bar centered on the support structure 1 (at the centre of the upper bar 10 of the bridge 8). By giving different colours or different visible nuances to the rib 42, the various fronts mounted on a single support structure 1 the rib 42 can be utilized as indicator of the type of front assembled to the support structure. The assembly of rib 42 in its housing 41 can be carried out with clearance facilitating their reciprocal engagement and thus ensuring the centering of the external surface of the projecting element 13 in the internal surface of the housing 12.

It is well understood that the present invention is in no way limited to the embodiments described and represented herein-above and it may be adapted to numerous variants available to the man skilled in the art, without departing from the spirit and scope of the invention.

I claim:

1. A spectacle-frame assembly comprising
   a support structure comprising
   substantially rigid support bar means with two ends
   spectacle sides mounted to said two ends, respectively, of said support bar means,
   said support bar means including a median portion which extends between said two ends of said support bar means and which has an inner side thereof directed toward the face of a user when said assembly is worn by the same,
   said inner side of said median portion being provided with holding recess means having two ends defined by at least two projecting portions of said support bar means,
   a pivot pin provided on said inner side of the median portion at a location adjacent to one end of said recess means
   a locking lever pivotally mounted at one of its ends on said pivot pin, said lever being displaceable between an unlocking position wherein it renders said holding recess means accessible and a locking position wherein said lever closes said holding recess means by bridging over said inner side of said median portion of the support bar means, and
   a projecting stopmember provided on said inner side of the median portion at a location adjacent to the opposite end of said recess means, and engageable by the opposite end of said lever to lock the latter in said locking position; and
   a front structure provided with at least one spectacle-glass and detachably assembled to said support structure, said front structure being provided with a protruding portion adapted to be detachably engaged in said holding recess means and to be locked therein by said locking lever when said lever is in said locking position, respective peripheral ends of said protruding portion being at least partially complementary to said ends of said holding recess means.

2. The spectacle-frame assembly as claimed in claim 1, wherein said holding recess means is formed by a cavity provided in said median portion of said support structure, said ends of said holding recess means being defined by respective opposite end wall portions of said cavity projecting from a cavity bottom wall portion extending between said end wall portions.

3. The spectacle-frame assembly as claimed in claim 2, wherein said end wall portions of said cavity are substantially perpendicular to said bottom wall portion and inclined with respect to each other.

4. The spectacle-frame assembly as claimed in claim 2, further including at least one pin projecting from the bottom wall portion of said cavity and extending towards the inner side of said median portion, and a corresponding slot provided in said protruding portion of the front structure and engaged by said at least one pin when said front structure is assembled to said support structure.

5. The spectacle-frame assembly as claimed in claim 2, further including at least one pin projecting from the bottom wall portion of said cavity and extending towards the innerside of said median portion, and a corresponding bore provided in said protruding portion of the front structure and engaged by said at least one pin when said front structure is assembled to said support structure.

6. The spectacle-frame assembly as claimed in claim 1, wherein said holding recess means is defined between said pivot pin and said protruding stop member is such a manner that one end of said holding recess means is formed by said pivot pin and the opposite end thereof is formed by said stop member; and said protruding portion of said front structure is constituted by a bar-shaped element integral with said front structure and provided at each of its ends with a notch adapted to be engaged by said pivot pin and said stop member, respectively, when said front and support structures are assembled to each other.

7. The spectacle-frame assembly as claimed in claim 1, wherein said support structure is provided at the inner side of said median portion thereof with a groove-shaped supplementary holding recess, and a mating rib-shaped supplementary protruding portion provided on said front structure which is engaged with said supplementary holding recess when said support and said front structures are assembled to each other.

8. The spectacle-frame assembly as claimed in claim 1, wherein said lever and said stop member are provided with respective mutually cooperating locking means for releasably locking said lever in said locking position.

* * * * *